United States Patent [19]

Crooker et al.

[11] Patent Number: 5,200,845
[45] Date of Patent: Apr. 6, 1993

[54] COLOR LIQUID CRYSTAL DISPLAY CONSISTING OF POLYMER-DISPERSED CHIRAL LIQUID CRYSTAL HAVING NEGATIVE DIELECTRIC ANISOTROPY

[75] Inventors: Peter P. Crooker, Honolulu, Hi.; Dengke Yang, Kent, Ohio

[73] Assignee: University of Hawaii at Manoa, Honolulu, Hi.

[21] Appl. No.: 857,678

[22] Filed: Mar. 25, 1992

Related U.S. Application Data

[63] Continuation of Ser. No. 430,673, Oct. 31, 1989, abandoned.

[51] Int. Cl.[5] ............................................. G02F 1/1347
[52] U.S. Cl. ........................................ 359/51; 359/53; 359/101
[58] Field of Search ............... 350/346, 350 S, 351, 350/350 R, 334, 336, 331 R

[56] References Cited

U.S. PATENT DOCUMENTS

| | | | |
|---|---|---|---|
| 3,680,950 | 8/1972 | Haas et al. | 350/336 |
| 3,836,230 | 9/1974 | Adams et al. | 359/53 |
| 4,246,302 | 1/1981 | Benton et al. | 350/351 |
| 4,252,417 | 2/1981 | Scheffer et al. | 359/77 |
| 4,506,957 | 3/1985 | Harrison et al. | 350/346 |
| 4,525,032 | 7/1985 | Hilsum | 350/346 |
| 4,659,501 | 4/1987 | Sugimori et al. | 350/346 |
| 4,673,255 | 6/1987 | West et al. | 359/51 |
| 4,685,771 | 8/1987 | West et al. | 359/51 |
| 4,688,900 | 8/1987 | Doane et al. | 350/351 |
| 4,688,901 | 8/1987 | Albert | 350/351 |
| 4,701,024 | 10/1987 | Kobayashi et al. | 359/51 |
| 4,818,076 | 4/1989 | Heppke et al. | 350/346 |
| 4,856,876 | 8/1989 | Fergason | 350/351 |
| 4,933,243 | 6/1990 | Hara et al. | 350/346 |
| 4,944,576 | 7/1990 | Lacker et al. | 350/346 |
| 4,994,204 | 2/1991 | Doane et al. | 359/93 |
| 5,056,898 | 10/1991 | Ma et al. | 359/93 |

FOREIGN PATENT DOCUMENTS

| | | | |
|---|---|---|---|
| 2139537 | 1/1973 | France | 359/52 |
| 0191203 | 9/1985 | Japan | 359/51 |
| 0128203 | 6/1986 | Japan | 359/51 |
| 0267524 | 10/1989 | Japan | 359/52 |
| 0285920 | 11/1989 | Japan | 359/52 |

OTHER PUBLICATIONS

Matsumoto et al. "Electronic Display Devices" John Wiley & Sons-1990-pp. 49-51.
Uchida-"Multicolored Liquid Crystal Displays" Optical Engineering-Jun. 1984-vol. 23-No. 3-pp. 247-252.
IBM Technical Disclosure Bulletin, vol. 15 No. 18 pp. 2538-2539 (1973).
Pichikyan et al., Soviet Journal of Quantum Electronics, vol. 6, No. 7 pp. 877-878 (1976).

*Primary Examiner*—William L. Sikes
*Assistant Examiner*—Tai V. Duong
*Attorney, Agent, or Firm*—Watts, Hoffmann, Fisher & Heinke

[57] ABSTRACT

A color liquid crystal display and display material formed by microdroplets of chiral or cholesteric liquid crystal phase dispersed in a polymeric matrix. The liquid crystal in the microdroplets exhibits strong negative dielectric anisotropy so that in the presence of an electric field the helical planes of the chiral material align perpendicular to the field. Incident light is reflected at a selected wavelength depending upon the helical pitch. In the field-OFF state, the liquid crystal directors are configured or randomly oriented so as to scatter incident light.

7 Claims, 2 Drawing Sheets ized dispersions of liquid crystal microdroplets. The phase separation of
COLOR LIQUID CRYSTAL DISPLAY CONSISTING OF POLYMER-DISPERSED CHIRAL LIQUID CRYSTAL HAVING NEGATIVE DIELECTRIC ANISOTROPY This application is a continuation of application Ser. No. 07/430,673, filed Oct. 31, 1989, now abandoned.

TECHNICAL FIELD

The present invention relates generally to liquid crystal materials and displays, and more specifically to a new chiral liquid crystal display and display material.

BACKGROUND ART

Chiral liquid crystal displays and display materials consisting generally of cholesteric liquid crystal entrapped in plastic sheets have been proposed in the past. U.S. Pat. No. 3,585,381, issued Jun. 15, 1971, discloses a color change display in which cholesteric liquid crystal is encapsulated in a suitable film. The color contrast and purity are stated to be improved by a top layer on the film which is indexed matched and conforms to the encapsulated layer. An associated U.S. Pat. No. 3,600,064 discloses various encapsulation procedures for incorporating cholesteric liquid crystal in a polymeric matrix. These patents suggest the possibility of adjusting color using an electrical stimulus or field; however, the disclosed cholesteryl esters have a small dielectric anisotropy and are relatively unresponsive to applied fields. Further, the patents do not disclose how the color is affected, and it may only be a wavelength shift of the reflected light or a phase change of the liquid crystal into a reflecting phase.

U.S. Pat. No. 3,620,889, issued Nov. 16, 1971, discloses another type of system in which cholesteric liquid crystal is entrapped in plastic. When heated or cooled, the system is either clear or opaque, and a color change phenomenon occurs. U.S. Pat. No. 4,101,207, issued Jul. 18, 1978, discloses still another system in which cholesteric liquid crystal is incorporated into a polymer. As disclosed in the example of this patent, the film is placed between transparent electrodes and displays a dynamic scattering effect when subjected to a voltage.

French patent application No. 74.30349 (Publication No. 2,343,234) discloses various cholesteric liquid crystal materials dispersed in water insoluble polymers. The materials are primarily temperature sensitive, and the esters disclosed do not appear to be electrically sensitive due to their small dielectric anisotropy.

Recent developments concerning entrapment of nematic liquid crystal microdroplets in light-transmissive, polymeric matrixes are disclosed in U.S. Pat. Nos. 4,671,618; 4,673,255; 4,685,771 and 4,688,900, the disclosures of which are incorporated by reference. The developments disclosed in these patents are light-modulating materials prepared as phase-separated dispersions of liquid crystal microdroplets. The phase separation of the liquid crystal in the polymer can be carried out by polymerization, thermal induction or solvent evaporation. Such materials are referred to as polymer dispersed liquid crystal material (PDLC).

The PDLC materials are usually made with nematic liquid crystal possessing positive dielectric anisotropy. The ordinary index of refraction typically is matched to the refractive index of the polymer so that in a field-ON state the display or material appears visible or clear because the optical axes of the microdroplets are aligned parallel to the field and normal to the viewing surface. In a field-OFF state, the optical axes of the microdroplets are randomly oriented or configured so that incident light is scattered and the material or display appears opaque.

DISCLOSURE OF THE INVENTION

An object of the present invention is to provide a new electrically addressable liquid crystal color display which is operable under ambient light in reflection or transmitted light in transmission.

Another object of the invention is to provide a new electrically addressable, liquid crystal color display in the form of a flat sheet or panel.

Still another object of the invention is to provide a new electrically addressable liquid crystal color display which is translucent or light scattering in a field-OFF state and color reflective or color transmissive in a field-ON state.

The foregoing objects are achieved by a liquid crystal color display comprising at least one sheet of liquid crystal material formed by microdroplets of liquid crystal phase dispersed in a polymeric matrix, the liquid crystal being in the cholesteric phase and having negative dielectric anisotropy. The new display material is further characterized in that the application of an electric field causes the helical planes of the cholesteric liquid crystal to align perpendicular to the direction of the field so as to selectively reflect light of a wavelength determined by the helical pitch of the cholesteric liquid crystal. In the field-OFF state, the polymer-liquid crystal boundary conditions result in a liquid crystal director configuration or random orientation such that incident light is non-preferentially scattered and the material is translucent or light-scattering.

The microdroplets of liquid crystal are dispersed in the polymeric matrix by phase separation as disclosed in U.S. Pat. Nos. 4,671,618; 4,673,255; 4,685,771, and 4,688,900. The polymer can be either thermosetting, such as a catalyst or U.V. curved thermoset epoxy, or selected from a wide range of thermoplastics, including modified epoxies cured by a non-crosslinking curing agent. As more fully disclosed in the foregoing patents, phase separation of the liquid crystal and resulting droplet formation can be accomplished by dissolving the liquid crystal in a polymer precursor which is then polymerized, by cooling a polymer melt containing dissolved liquid crystal, or by dissolving the liquid crystal and polymer in a common solvent which is then evaporated.

The liquid crystal making up the microdroplets may be a mixture of different liquid crystal materials, one or more of which individually is not in the cholesteric liquid crystal phase. It is essential to the successful practice of the invention that the admixture rather than any one of the individual components exhibit a cholesteric liquid crystal phase. Therefore, it is to be understood that the terms "cholesteric" and "chiral"used in the specification and claims encompass single liquid crystal materials as well as admixtures exhibiting the cholesteric phase.

Since the principal of operation of the new display depends upon the liquid crystal molecules turning perpendicular to the applied electric field, whereby the helical planes are generally parallel to the viewing surface, the liquid crystal must exhibit strong or large negative dielectric anisotropy. A negative anisotropy ranging upward in strength from about −3 is believed to be satisfactory. The negative anisotropy of the materials disclosed in the examples which have been found satisfactory is about −4.

The new display material selectively reflects light of a wavelength which is dependent upon the helical pitch of the chiral liquid crystal. Thus, the new polymer-dispersed chiral liquid crystal (PDCLC) display can be made to reflect virtually any color by selecting liquid crystals of known helical pitch. Single-color displays can be fabricated with a single sheet of the new material or, alternatively, a plurality of sheets, each reflecting a different color, can be stacked to produce a multi-color display. In either case, the displays are operative without polarizers in ambient light in reflection. With the addition of a circular polarizer, they can be back-lit to operate in transmission. This unique ability to achieve full-color transmission or reflection offers many potential applications. For example, the displays of the invention can be used in place of conventional black and white liquid crystal displays to provide a more appealing black and color display for applications such as watches, calculators, computers and TV screens.

When three sheets of the new material of the invention, each reflecting a different primary color, are stacked together or combined as one composite sheet and are separately addressed, it is possible to achieve any desired color in reflection by the principle of additive color mixing. Such multi-color reflective displays can be used in TV bulletin boards, watches, computer displays, etc.

When sheets reflecting different primary colors are stacked or combined as a composite sheet in a display and the display is operated in transmission by back-lighting, it is possible to achieve any desired color by the rule of subtractive color mixing. In such transmissive displays a single, circularly polarizing filter is used to filter either the input light or the exiting light. Useful applications of transmissive displays include computer controlled projection panels used with overhead projectors, theater marquees, traffic lights, color displays to be used in darkrooms, etc.

In other applications, three independently activated sheets containing the three primary colors can be incorporated into one composite sheet to produce a color-adjustable shutter for transmitted light. The composite sheet is translucent when the voltage is off and will selectively block or reflect light when the voltage is on. The wavelengths that are blocked or reflected can be selected by activating one or more of the elements of the composite sheet.

The display of the invention is usable as a voltage-controllable reflecting filter for circularly polarized light. When the voltage is off, no light is reflected. When the device is on, circularly polarized light at the selective reflection wavelength is reflected and orthogonally polarized light at the same wavelength is transmitted. Both left and right handed sheets can be incorporated into one composite sheet so that it would be possible to electrically select the reflected or transmitted polarization at the selective reflection wavelength or, by turning both sheets on simultaneously, reflect all the light at that wavelength.

Other objects, advantages, applications and a fuller understanding of the invention will be had from the accompanying drawings and the following detailed disclosure.

BEST MODES FOR CARRYING OUT THE INVENTION

Figure 1A:
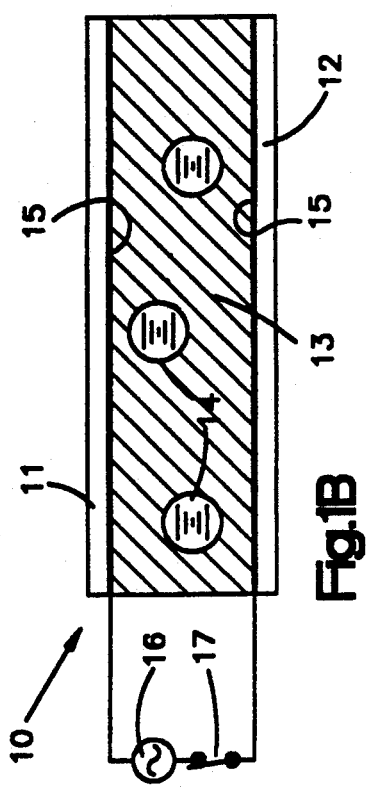
FIGS. 1(A) and 1(B) are diagrammatic, fragmentary cross-sectional views of a display device of the invention in the off and on states, respectively, the device containing a sheet of light-modulating material depicted with representative microdoplets of liquid crystal phase dispersed in a polymer.
Figure 1B:
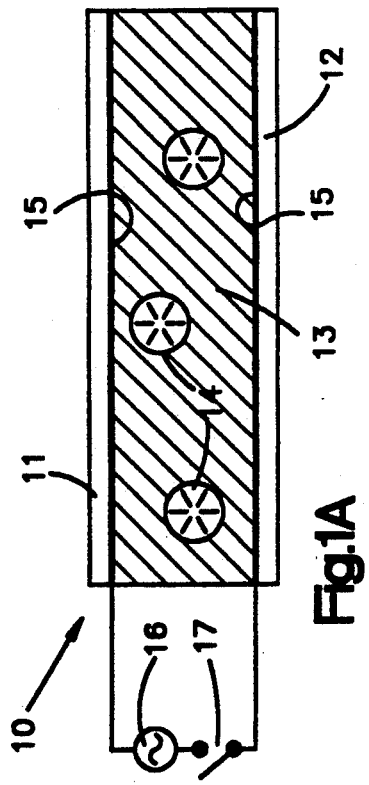

Referring now to the drawings, and to FIGS. 1(A) and 1(B) in particular, a liquid crystal color display made according to the invention is generally indicated by reference numeral 10. The display 10 comprises a pair of glass or plastic substrates 11, 12 and a solid polymer sheet 13 containing phase dispersed microdroplets 14 of chiral liquid crystal. The inner surfaces of the glass substrates 11, 12 have transparent conducting electrode coatings 15 attached to an AC voltage source 16. The voltage supply is controlled by a switch 17.

In the field-ON state of FIG. 1(B), the helical planes of the chiral liquid crystal in the microdroplets 14 are aligned generally perpendicular to the field applied across the material 13 by the electrodes 15. In this aligned condition, a portion of light incident on the substrate 11 or 12 will be reflected. The reflected light will have a wavelength determined by the helical pitch of the chiral liquid crystal and will have a circular polarization (right or left) determined by the sense of twist of the chiral material. That light which is not reflected is transmitted through the display and is not absorbed. If, for example, the chiral liquid crystal display reflects incident right circularly polarized (RCP) green light, the transmitted light will, by the rule of subtractive color mixing, be magenta plus left circularly polarized (LCP) green. If the chiral liquid crystal display reflects RCP red incident light, the transmitted light will be cyan plus LCP red, while an RCP blue reflecting display will transmit yellow plus LCP blue.

FIG. 1(A) illustrates the display 10 in a field-OFF state. The boundary conditions between the microdroplets 14 and the polymer 13 result in a liquid crystal director configuration that non-preferentially scatters light incident on a display. In the field-OFF, light scattering state, the display 10 is translucent and non-reflecting.

Figure 2:
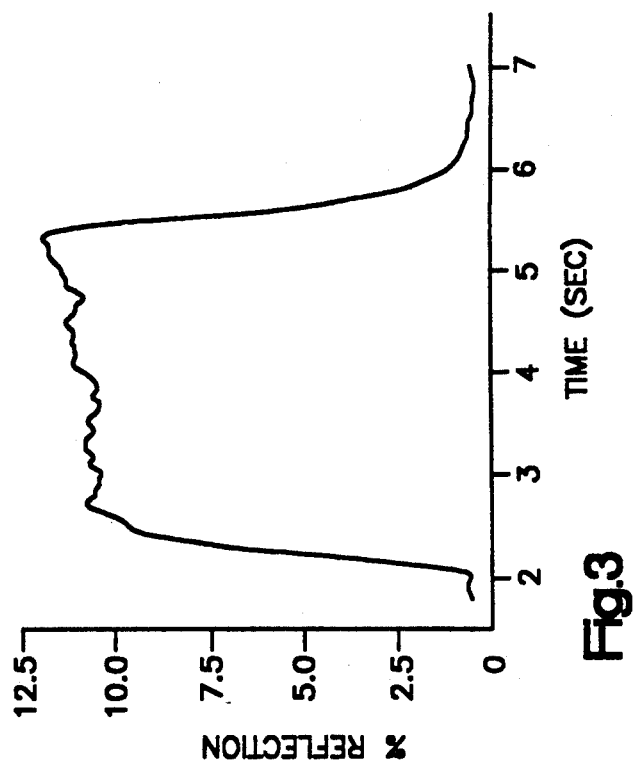
FIG. 2 is a graph showing reflectivity of a green reflecting display versus wavelength for various applied voltages.
Figure 3:
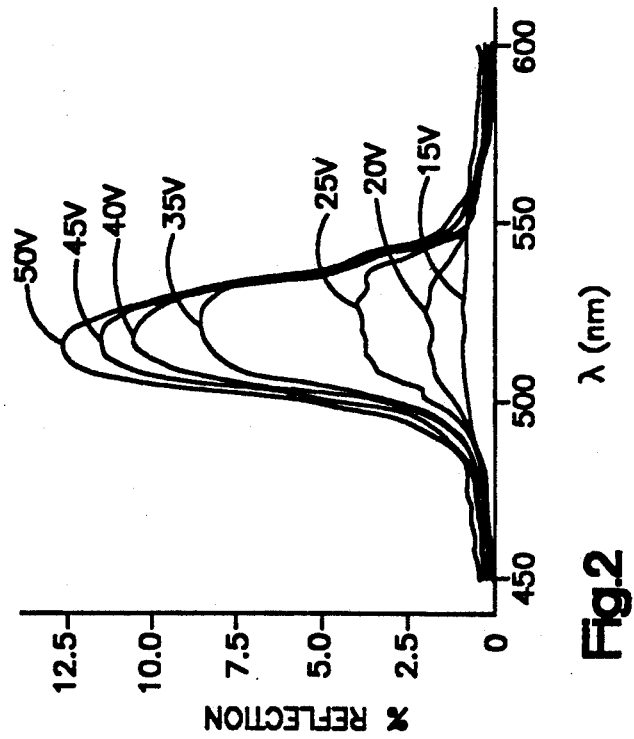
FIG. 3 is a graph showing reflected intensity versus time for a display subjected to a voltage pulse.

FIG. 2 shows the reflected intensity of a green reflecting display versus wavelength for various applied voltages. The sharp spectral peak at 515 nm confirms the pure appearance of the reflected color. FIG. 3 shows the time response of the green reflecting display to a rapid voltage step. The response time is, among other things, related to the size of the droplets with larger droplets having a slower response time. Typical droplet sizes in displays of the invention range from about 1 micron to 20 microns, although, smaller or larger droplet sizes can be produced for special situations. Reference is made to U.S. Pat. No. 4,673,255 which discloses techniques for controlling microdroplet size in phase dispersed materials. It is to be understood that FIGS. 2 and 3 are based on data obtained from experimental displays described in Example 1, and do not represent ultimate or optimum performance of displays made according to the invention.

Figure 4:
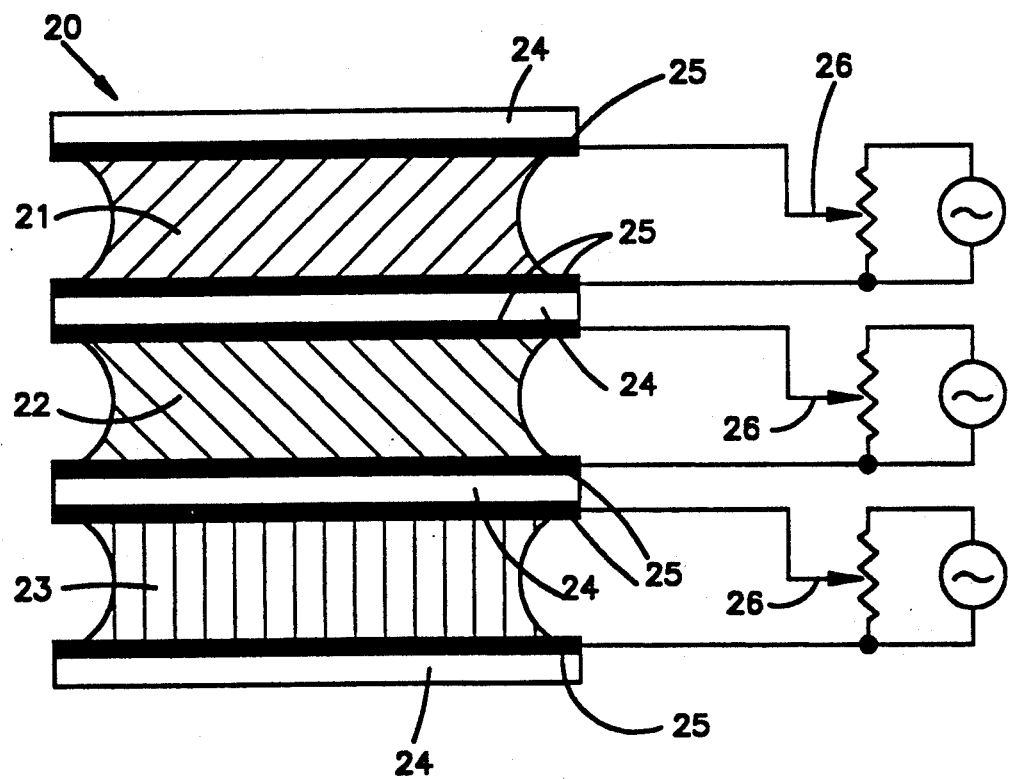
FIG. 4 is a schematic diagram showing three stacked display sheets, each reflecting a different color and being separately addressable.

FIG. 4 illustrates the operating principle of a stacked or composite sheet display, each element of which reflects a different color. The display is generally designated by reference numeral 20 and includes three sheets 21-23 sandwiched between substrates 24 and conducting electrodes 25. The sheets 21-23 are similar to that described in connection with FIGS. 1(A) and 1(B), and are comprised of polymer dispersed microdroplets of chiral liquid crystal. In this example of the invention, each element or sheet 21-23 is designed to reflect a different primary color. For example sheet 21 may be red reflecting, sheet 22 green reflecting, and sheet 23 blue reflecting.

As shown in FIG. 4, the sheets 21-23 are separately addressable by variable voltage supplies 26; alternatively, it is to be understood that each sheet could be actuated by an on-off voltage supply in the manner of FIGS. 1(A) and 1(B). By separately controlling the actuation and reflecting intensity of each color element or sheet, a continuous range of colors may be observed in either a reflection or transmission mode, since light with a wavelength not reflected by one element is still available to be reflected by another element. In transmission mode, a circular polarizer (not shown) is necessary for complete color control.

In the reflection mode, the elements or sheets 21-23 are selectively actuated to respectively reflect the primary colors red, green and blue. The reflected colors will combine additively and all the colors in an area of the chromaticity diagram will be available. In the transmission mode, all colors can be achieved by subtractive color mixing. Thus, actuation of elements 21, 22 will achieve blue color in transmission, actuation of elements 22, 23 will achieve red in transmission, and so on. In either the reflection or transmission modes, light that is not transmitted is reflected and vice-versa, so that no light is absorbed and the display will not be overheated. This is an important consideration in applications such as overhead projection where the incident light is very intense.

EXAMPLE 1

A green reflecting display was constructed and successfully demonstrated. Microdroplets of chiral liquid crystal were phase dispersed in a thermoplastic polymer consisting of polyvinyl butyryl. The microdroplets were a mixture of nematic and chiral liquid crystal. The liquid crystal mixture had a strong negative dielectric anisotropy of about −4 and the chiral liquid crystal was very highly twisted. The proportions in percent by weight were 47% polyvinyl butyryl, 20% chiral liquid crystal and 33% nematic liquid crystal. The materials were dissolved in chloroform solvent, mixed, and placed on a conducting slide. The solvent was then evaporated at high temperature. An upper conducting slide or substrate was placed on the polymer/liquid crystal mixture which was then cooled to approximately 115° C., at which point the liquid crystal phase separated as microdroplets. The size of the microdroplets is controllable by the cooling schedule and, in this example, the diameter was about 15 microns. The reflected intensity versus wavelength for different applied voltages, and the response of the display to a step voltage are shown in FIGS. 2 and 3, respectively.

EXAMPLE 2

A red reflecting display material was prepared by the solvent evaporation technique described in Example 1. The proportions of materials were 48.3% polyvinyl butyryl, 17.2% chiral liquid crystal and 34.5% nematic liquid crystal. After preparation, the material was examined in a reflecting microscope at a temperature of 85° C. The chiral liquid crystal droplets in the polymer matrix appeared bright red.

EXAMPLE 3

A blue reflecting display material was prepared by the solvent evaporation technique described in Example 1. The proportions of material were 46.8% polyvinyl butyryl, 21.9% chiral liquid crystal and 31.3% nematic liquid crystal. The hardened polymer with the phase dispersed microdroplets was examined in a reflecting microscope at 85° C. The microdroplets appeared blue.

EXAMPLE 4

A display material was prepared from a catalyst-cured epoxy. The liquid crystal was a chiral mixture consisting in percent by weight of 47% EN38 (Chisso Chemical Co.), 30% CE10 (British Drug House), and 23% CM20 (Chisso Chemical Co.). The epoxy consisted of 16.7% EPON 828 (Shell Chemical Co.), 32.3% MK107 (Wilmington Chemical Co.), and 50% CAP-CURE 3800 (Miller-Stephenson Chemical Co.). The liquid crystal and epoxy mixtures were then combined in a 3:1 epoxy:liquid crystal ratio, allowed to cure at room temperature for 3 hours, then placed on conducting microscope slides and baked at 65° C. for 30 hours. The resulting microdroplets were 10 μm in diameter.

Many modifications of the invention will be apparent to those skilled in the art in view of the foregoing detailed disclosure. Therefore, it is to be understood that, within the scope of the appended claims, the invention can be practiced otherwise than as specifically shown and described.

We claim:

1. A liquid crystal color display comprising at least one sheet of liquid crystal material formed by microdroplets of liquid crystal having a generally spherical shape and a diameter of about 1-20 μm dispersed in a polymeric matrix by phase separation, said liquid crystal being in the cholesteric phase and having negative dielectric anisotropy of at least −3, said material being further characterized in that:

the liquid crystal in said microdroplets has a liquid crystal director configuration or a random orientation in the absence of an electric field so that incident light is scattered, and the application of an electric field is effective to cause the cholesteric liquid crystal in said microdroplets to align perpendicular to the direction of the field to form a planar helical texture having a helical pitch so as to selectively reflect light of a wavelength determined by the helical pitch of the chiral liquid crystal.

2. A display according to claim 1 incorporating at least two sheets of liquid crystal material, said sheets being stacked and each sheet reflecting a different primary color.

3. A display according to claim 1 or claim 2 including electrode means on outer sheet surfaces for establishing said field.

4. A liquid crystal color display comprising layers of liquid crystal material formed by microdroplets of chiral liquid crystal having a generally spherical shape and a diameter of about 1-20 μm dispersed in a polymeric matrix by phase separation, said chiral liquid crystal having negative dielectric anisotropy of at least −3, said material being further characterized in that:

the liquid crystal in said microdroplets has a liquid crystal director configuration or a random orientation in each layer in the absence of an electric field so that incident light is scattered, the application of an electric field is effective to cause the chiral liquid crystal in said microdroplets to align perpendicular to the direction of the field to form a planar helical texture having a helical pitch so as to selectively reflect light of a wavelength determined by the helical pitch of the chiral liquid crystal, a plurality of said layers have chiral liquid crystal of different helical pitches so that each layer will reflect a different color of light, said layer being vertically arranged to form a stacked array, and means for selectively applying a voltage to each of said plurality of layers.

5. The display according to claim 4 wherein one of said layers reflects red light, another reflects green light and a third reflects blue light.

6. A display according to claim 4 or claim 5 wherein said device is operative in a reflecting mode to achieve a range of reflected colors by additive color mixing.

7. A display according to claim 4 or claim 5 which is operative in transmission to achieve a range of colors by subtractive color mixing.

* * * * *